United States Patent
Aoki et al.

(10) Patent No.: US 6,704,907 B1
(45) Date of Patent: Mar. 9, 2004

(54) DIGITAL CONTENTS EDITING METHOD AND APPARATUS THEREOF

(75) Inventors: Masakatsu Aoki, Tokyo (JP); Ken Tsutsuguchi, Tokyo (JP); Yasuhiko Watanabe, Tokyo (JP); Noboru Sonehara, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 09/044,806

(22) Filed: Mar. 20, 1998

(30) Foreign Application Priority Data

Mar. 24, 1997 (JP) .............................. 9-069922

(51) Int. Cl.⁷ ..................... G06F 7/00; G06F 17/30; G06F 15/16
(52) U.S. Cl. .................. 715/530; 709/204; 709/205
(58) Field of Search ................. 345/302, 328, 345/329, 331, 330, 442, 419; 709/205, 204; 707/203, 530; 386/52; 715/530

(56) References Cited

U.S. PATENT DOCUMENTS

| | | | | |
|---|---|---|---|---|
| 5,008,853 A | * | 4/1991 | Bly et al. ................... | 345/331 |
| 5,159,669 A | * | 10/1992 | Trigg et al. ................ | 345/357 |
| 5,206,934 A | * | 4/1993 | Naef et al. ................. | 345/330 |
| 5,544,317 A | * | 8/1996 | Berg .......................... | 709/235 |
| 5,629,980 A | * | 5/1997 | Stefik et al. ................ | 380/4 |
| 5,706,510 A | * | 1/1998 | Burgoon ..................... | 707/203 |
| 5,799,320 A | * | 8/1998 | Klug .......................... | 707/540 |
| 5,841,977 A | * | 11/1998 | Ishizaki et al. ............. | 345/501 |
| 5,874,951 A | * | 2/1999 | Sakakibara et al. ........ | 345/331 |
| 5,880,743 A | * | 3/1999 | Moran et al. ............... | 345/473 |
| 5,886,707 A | * | 3/1999 | Berg .......................... | 345/329 |
| 5,913,920 A | * | 6/1999 | Adams et al. .............. | 709/204 |
| 5,940,082 A | * | 8/1999 | Brinegar et al. ........... | 345/442 |
| 6,199,116 B1 | | 3/2001 | May et al. .................. | 709/310 |
| 6,237,025 B1 | * | 5/2001 | Ludwig et al. ............. | 709/204 |
| 6,292,619 B1 | * | 9/2001 | Fujita et al. ................ | 386/52 |

FOREIGN PATENT DOCUMENTS

| | | |
|---|---|---|
| EP | 0 406 946 A1 | 1/1991 |
| EP | 0 539 114 A2 | 4/1993 |
| JP | 58-201016 | 11/1983 |
| JP | 02-002450 | 1/1990 |
| JP | 04-338856 | 11/1992 |
| JP | 05-094441 | 4/1993 |

(List continued on next page.)

OTHER PUBLICATIONS

Shen–Ching Jeng et al., Network management platform approach and its application–Kview II, IEEE Local Computer Networks, 19th Conference, pp. 417–424, Oct. 1994.*

(List continued on next page.)

Primary Examiner—Stephen S. Hong
Assistant Examiner—William L. Bashore
(74) Attorney, Agent, or Firm—Pennie & Edmonds LLP

(57) ABSTRACT

A digital contents editing method performs an editing operation of digital contents with a plurality of computers connected via a network. A digital contents editing apparatus or server accumulates the initial data of the digital contents and the editing operation information which is digitized, and transfers the editing operation information to clients which are involved in the editing operation. Each client then performs an editing operation of the digital contents by creating the editing operation information, in which the editing operation of the digital contents is digitized, and communicates only the editing operation information to other clients via the server and the network.

22 Claims, 11 Drawing Sheets

FOREIGN PATENT DOCUMENTS

| | | |
|---|---|---|
| JP | Hei-6-250907 | 9/1994 |
| JP | 6-274395 | 9/1994 |
| JP | 7-115571 | 5/1995 |
| JP | Hei-8-63382 | 3/1996 |
| JP | 08-202692 | 8/1996 |
| JP | 8-509824 | 10/1996 |
| JP | 9-14976 | 1/1997 |
| JP | 9-33271 | 2/1997 |
| JP | Hei-9-91228 | 4/1997 |
| JP | 10-228402 | 8/1998 |

OTHER PUBLICATIONS

Overlay Mechanism for Annotation Sharing and Remote Window–Control, IBM Technical Disclosure Bulletin, Jun. 1993, Volum 36, Issue 6A, pp. 407–410.*

H. Nishino et al., "Development of a distributed virtual environment framework", Technical Report of IEICE, vol. MVE 96–50 (Nov. 1996), pp. 33–39 (1996).

M. Aoki et al., "Network contents creation using editing histories", Proceedings of the 1997 Information And Systems Society Conference of IEICE, Sep. 1997.

* cited by examiner

FIG.6 aCircle := Circle new center: (100@ 100) radius: 10.
    aCircle changedColor: Red.
    aCircle moveTo: (150@ 50).
    aLine := Line new from: (20@ 20) to: (130@ 80).
    aLine changedColor: Blue.

FIG.7

(groundDate myContents)
    aCircle
     center: 150@ 50
     radius: 10
     myColor: Red
    aLine
     beginPoint: 20@ 20
     endPoint: 130@ 80
     myColor: Blue

DIGITAL CONTENTS EDITING METHOD AND APPARATUS THEREOF

BACKGROUND OF THE INVENTION

1. Technical Field of the Invention

The present invention relates to a method and apparatus for editing digitized data or data groups relating to computers.

This application is based on the patent application No. Hei 9-69922 filed in Japan, the content of which is incorporated herein by reference.

2. Description of the Related Art

Conventionally, the process of editing digitized data or data groups (hereinafter, referred to as digital contents) relating to computers, for example, when performing an editing operations such as modeling in computer graphics on a plurality of computers via a network, it was necessary to first download the contents data stored in the server to a client via the network, then perform the editing operation on said client, afterwhich the contents data of the obtained results are sent back to the server via the network once again.

However, with the above mentioned method, there exists problems such as the overloading of the network when the amount of the contents data is large.

SUMMARY OF THE INVENTION

The present invention, hence, proposes to offer a digital contents editing method and apparatus therefor which allows the execution of the editing operation of the digital contents over a plurality of computers without overloading the network.

In order to achieve this objective, the present invention proposes a digital contents editing method for performing the editing operation of the digital contents by gathering the initial data of the digital contents and the editing operation information which has digitized the editing operation of the digital contents in at least one computer, while transferring these data to all the computers which are to be involved in the editing operation, and by having each of those computers digitize the editing operation of the digital contents and create an editing operation information, and finally, by having only those editing operation information communicated via the network.

In addition, the present invention proposes a digital contents editing method and apparatus therefor having a server perform the editing of the digital contents by shared operation with the connected clients via a network. The server achieves this objective by, at the least, recording the initial data of the digital contents, by sending the information necessary for the start of the digital contents editing operation to a client according to a request from said client, by orderly accumulating as history, the editing operation information which has digitized the editing operation of the digital contents sent from the client, and by sending said editing operation information to other clients. The present invention also proposes a recording medium which records a program which allows a computer to perform the above described function.

In addition, the present invention proposes a digital contents editing method and apparatus therefor having a client perform the editing of the digital contents by shared operation with the connected server via a network. The client achieves this objective by obtaining from the server and recording the information necessary for the start of the digital contents editing operation, by digitizing the editing operation of the digital contents and sending that to the server as the editing operation information, and by recording, as necessary, the editing operation information sent from the server.

According to the above, the data which is sent among the server and the clients is simply the editing operation information. Therefore, it is possible to execute the digital contents editing operation over a plurality of computers without overloading the network.

BRIEF DESCRIPTION OF THE DRAWINGS

FIG. 6 is a diagram which illustrates an example of an editing operation information.

FIG. 7 is a diagram which illustrates an example of a contents data.

DETAILED DESCRIPTION OF THE PREFERRED EMBODIMENTS OF THE INVENTION

Below, the present invention will be explained in detail with reference to drawings.

Embodiment 1

Figure 1:
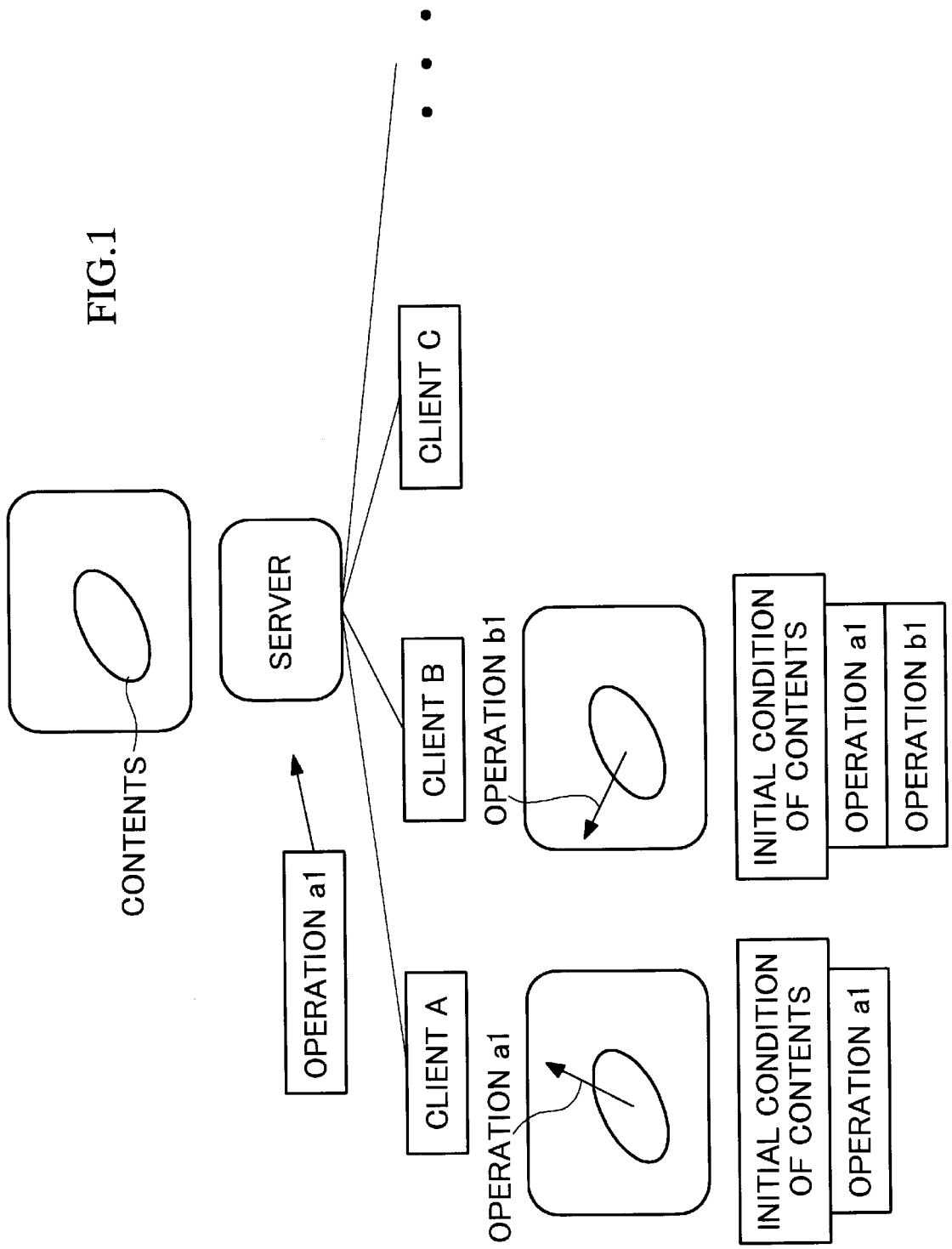
FIG. 1 is a conceptual diagram which illustrates the concept of an example of an embodiment of the present invention.

FIG. 1 is an example of a preferred embodiment of the present invention and it illustrates a concept of how a single server and a plurality of clients A, B, C, . . . , which are connected via a network, perform the editing operation of digital contents. The server and each of the clients maintain the initial data of the digital contents, the editing operation information, and the (edited) contents data from the corresponding editing operation.

At this point, the editing operation of the clients and the editing operation information, in which the editing operation is digitized, and the contents data with respect to the clients will be explained. Here, the initial data is set so that the editing operation is started with the digital contents being empty. For example, the editing operation of a client is performed in the following order:

draw a circle with a radius of 10 at position (100, 100)
change the color of that circle to red
move the position of that circle to position (150, 50)
draw a line from position (20, 20) to position (130, 80)
change the color of that line to blue.

The editing operation information in which these editing operations are digitized may, as an example, be expressed as FIG. 6. The editing operation information which is accumulated in order is referred to as the history of the editing operation information. In addition, the contents data may, as an example, be expressed as FIG. 7 at the point where the above described editing operations are completed. As one can see, the contents data expresses the final condition of the generated drawing. The initial data is set to be the initial contents data when the editing operation is started.

Figure 2:
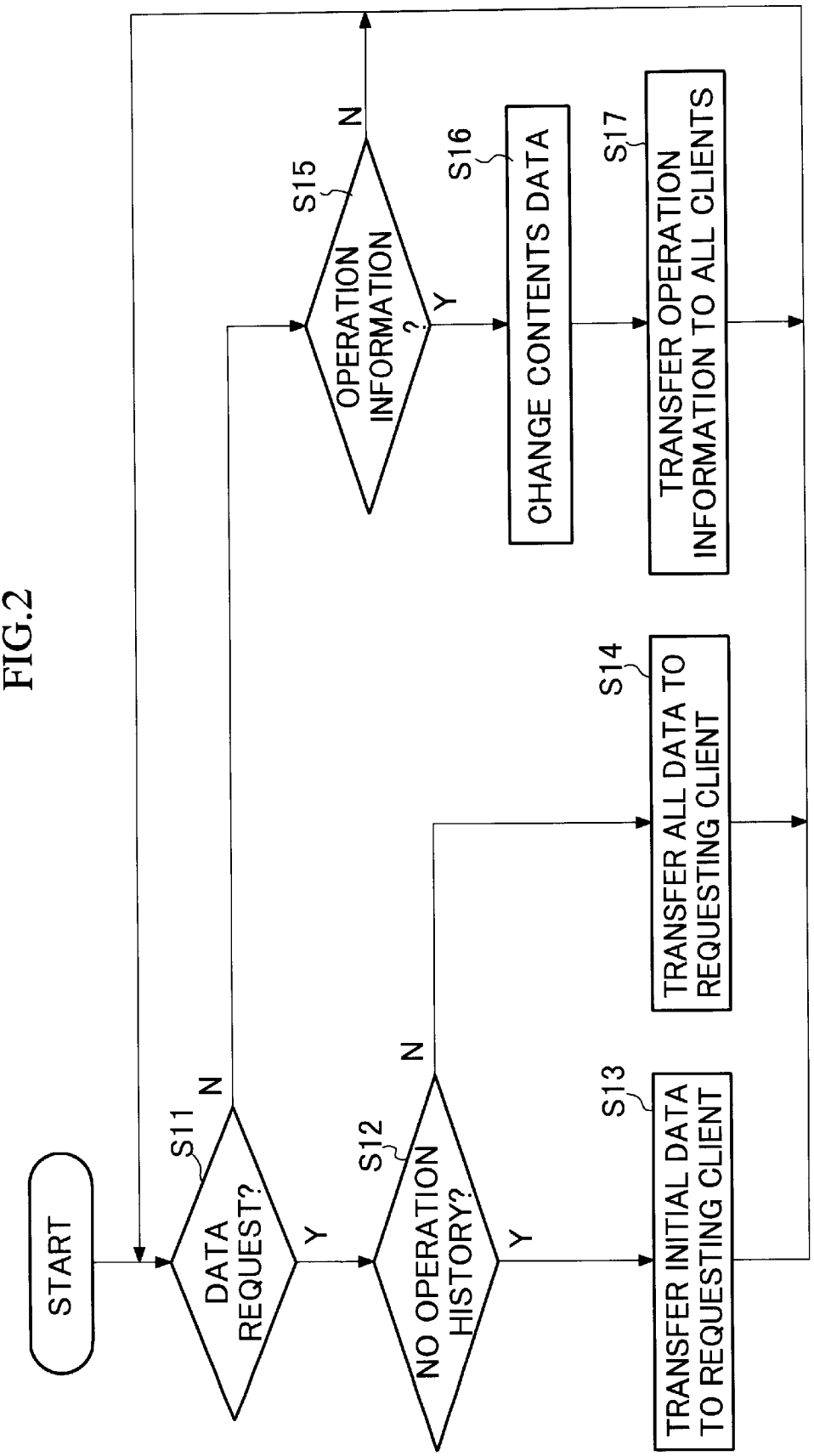
FIG. 2 is a control flow chart of a server.
Figure 3:
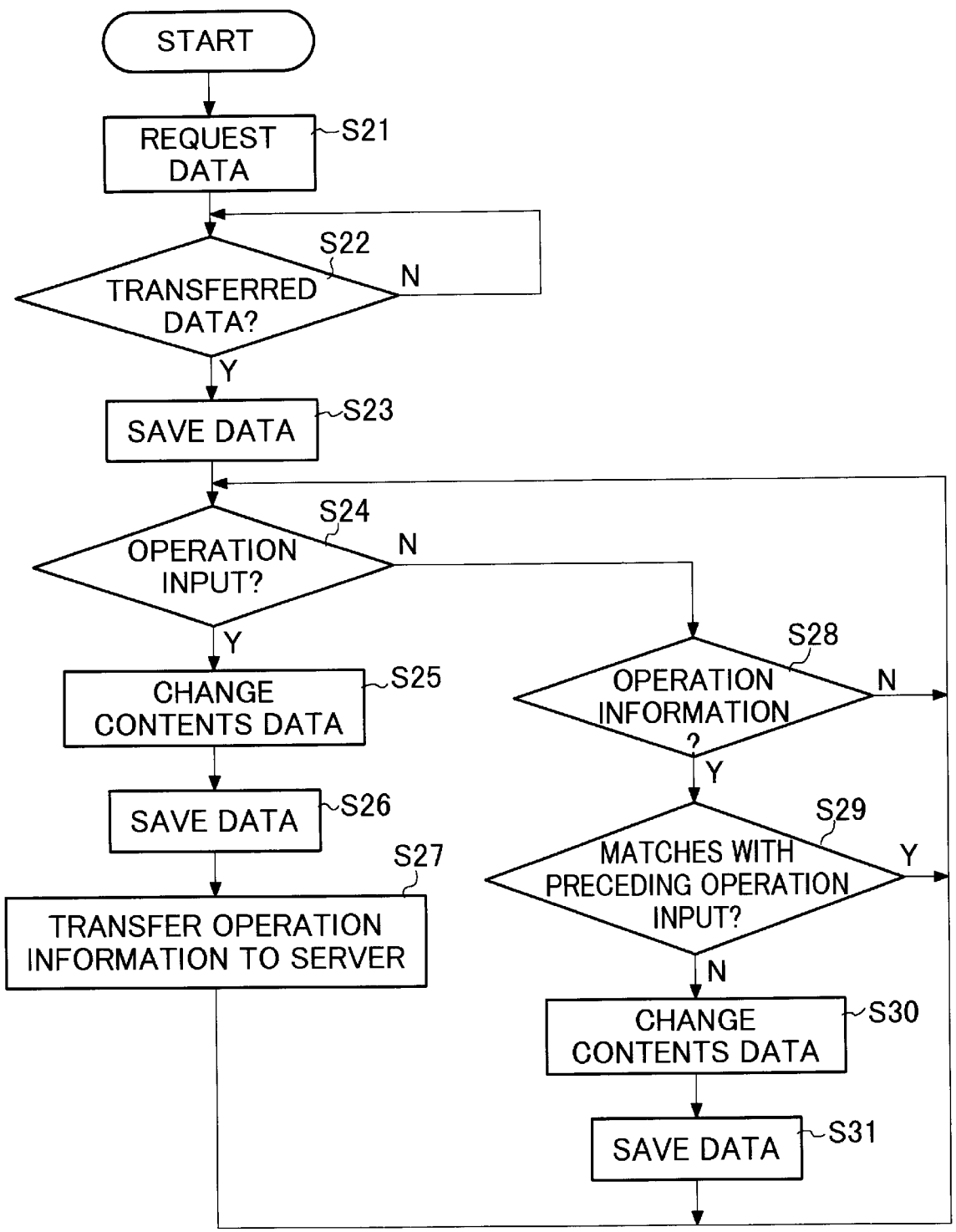
FIG. 3 is a control flow chart of a client.

FIG. 2 is a control flow chart of the server, and FIG. 3 is a control flow chart of the clients.

With respect to the above structure, when a single client which is involved in the editing operation gives a request for data to the server (step S21), the server, at the point (step S11), finds out whether or not there are any operation histories from the other clients (step S12). If there are no operation histories, then the server transfers only the initial data of the contents (step S113), but if there already exist some operation histories, then the server transfers all of the information, that is, the initial data of the contents, the editing operation information and the contents data from the corresponding editing operation (step S14). (In order to lessen the amount of data, however, it may be desirable to transfer only the initial data and the editing operation information or only the contents data from the corresponding editing operation. In other words, it may be desirable to have the sum of the initial data and the amount of data of the editing operation information compared with the amount of data of the contents data, and to transfer the lesser of the two as the information necessary for the start of the editing of the digital contents.)

On the other hand, the client which receives the above described information maintains this information (steps S22, S23). The information received here will be the information which is required for the start of the editing of the digital contents. At this client, an editing operation is performed on the contents data (operation input) (step S24), the contents data is changed at this client (step S25), this contents data is saved (step S26), and the above editing operation is digitized, an editing operation information is created, and this editing operation information is transferred to the server (step S27).

In addition, when the server receives the operation information from that single client (step S15), the contents data at the server is changed (step S16), while this operation information is transferred to all of the clients (step S17).

Moreover, each of clients which receive the above mentioned operation information determines whether or not the operation information matches with the preceding operation input (step S29), and if it matches, then the operation information is deemed to be its own operation input and is ignored, and if it does not match, then the contents data is changed and saved (steps S30, S31).

Figure 8:
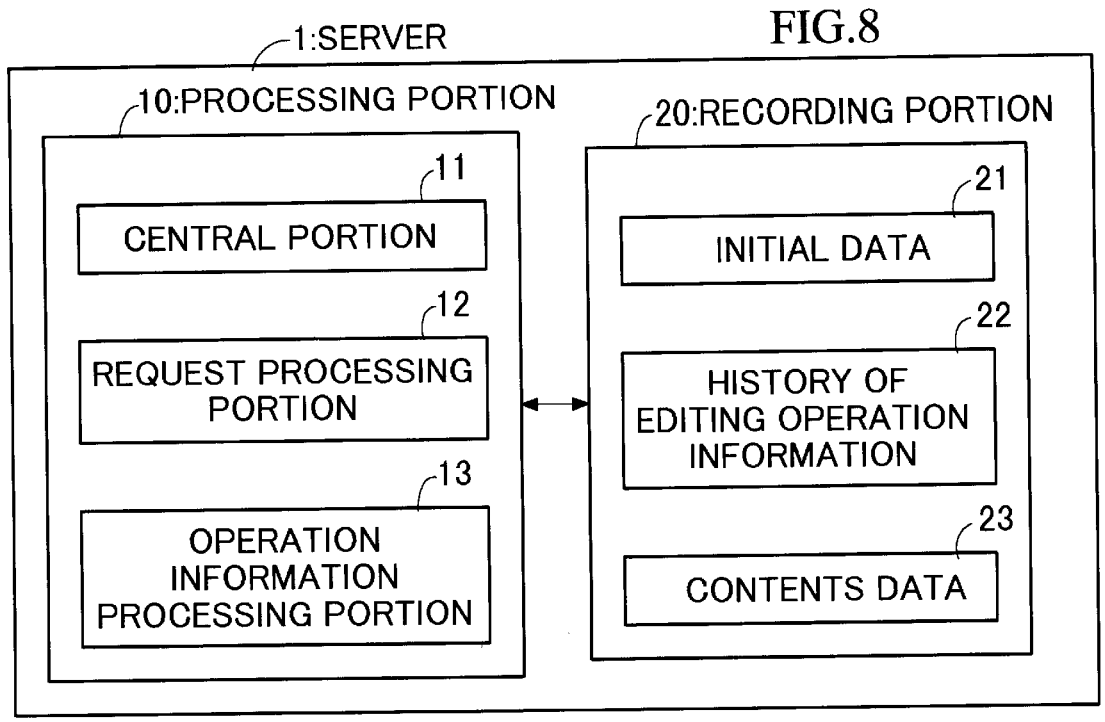
FIG. 8 is a diagram which illustrates an example of the structure of the server according to the first preferred embodiment.
Figure 9:
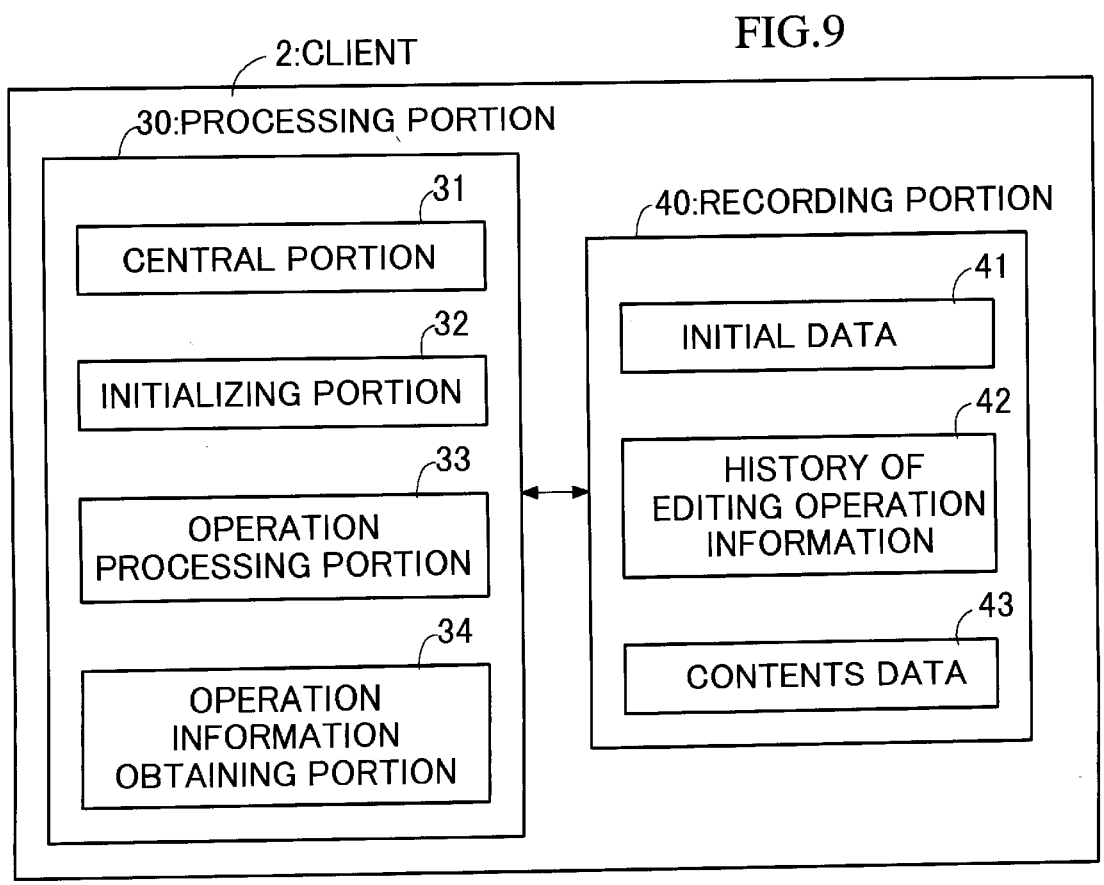
FIG. 9 is a diagram which illustrates an example of the structure of a client.

Next, the structures of the apparatuses of the server and the clients which operate according to the above described control flow are illustrated in FIG. 8 and FIG. 9. The apparatuses of the clients A, B, C, . . . , etc. illustrated in FIG. 1 has the structure illustrated in FIG. 9.

FIG. 8 is a diagram which illustrates the structure of the digital contents editing apparatus of the server. Hereinafter, the digital contents editing apparatus of the server will simply be referred to as the "server".

The server 1, when roughly categorized, is formed by a processing portion 10 which realizes the server functionality, and a recording portion 20 which records each type of data.

Specifically, the processing portion 10 is formed by a central portion 11, a request processing portion 12, and a operation information processing portion 13. Here, the central portion 11 performs the analysis of the contents of a request or the information sent from the clients, and activates either the request processing portion 12 or the operation information processing portion 13 in order to process the request or the information. The request processing portion 12 performs the process of sending the information necessary for the start of the editing of the digital contents to a client according to the request from that client. In addition, the operation information processing portion 13 performs the process of orderly accumulating the editing operation information from the clients in the recording portion 20 and the process of sending this operation information to all of the clients.

Now, the relationship between each of the processing portions and the control flow of FIG. 2 will be explained.

The central portion 11 makes the judgments of step S11 and step S15. And, if the condition is satisfied at the judgment of step S11, then it activates the request processing portion 12, and has the request processing portion 12 process the concerned request. In addition, if the condition is satisfied at the judgment of step S15, then it activates the operation information processing portion 13, and has the operation information processing portion 13 process the editing operation information sent from a client. The central portion 11 continually monitors for a request from a client (step S11) and for an editing operation information sent from a client (step S15), and if the conditions are satisfied, the central portion 11 activates the request processing portion 12 or the operation information processing portion 13 depending on the case.

In addition, the operation of the request processing portion 12 is step S12 through step S14. And, the operation of the operation information processing portion 13 is steps S16, S17.

The processing portion 10 may be realized by a special hardware or the functions of the processing portion 10 may be realized by having a CPU (Central Processing Unit) which is not illustrated within the processing portion 10 execute a program.

In addition, an initial data 21, a history of the editing operation information 22, and a contents data 23 are recorded in the recording portion 20. The recording portion 20 may be formed by recording apparatuses such as RAM's (Random Access Memory) or hard disks.

FIG. 9 is a diagram which illustrates the structure of a digital contents editing apparatus of a client. Hereinafter, the digital contents editing apparatus of a client will simply be referred to as a "client".

The client 2, when roughly categorized, is formed by a processing portion 30 which realizes the client functionality and a recording portion 40 which records each type of data.

In addition, the processing portion 30 is formed by a central portion 31, an initializing portion 32, a operation processing portion 33, and a operation information obtaining portion 34. Here, the central portion 31 performs the analysis of the information sent from the server and the input information from the user of this apparatus, and in order to process those information, the central portion 31 activates either the initializing portion 32, the operation processing portion 33, or the operation information obtaining portion 34. The initializing portion 32 obtains the information which is required for the start of the editing of the digital contents from the server, and has the recording portion 40 record that information. The operation processing portion 33 digitizes the editing operation of the digital contents and sends this data to the server as the editing operation information. The operation information obtaining portion 34 has the recording portion 40 record the editing operation information sent from the server when deemed necessary.

Now, the relationship between each of the processing portions and the control flow of FIG. 3 will be explained.

The central portion 31 activates the initializing portion 32 when participating in the editing of the digital contents. In addition, the judgments of step S24 and step S38 are performed by the central portion 31. If the condition is satisfied at the judgment of step S24, then it activates the operation processing portion 33 and has this operation processing portion 33 process based on the input. In addition, if the condition is satisfied at the judgment of step S28, then it activates the operation information obtaining portion 34, and has this operation information obtaining portion 34 process the editing operation information which is sent from the server. The central portion 31 continually monitors for an operation input by a user (step S24) and for a transfer of an editing operation information from the server (step S28), and if the conditions are satisfied, activates the operation processing portion 33 or the operation information obtaining portion 34.

The operation of the initializing portion 32 is corresponding to steps S21–S23 in FIG. 3. And the operation of the operation processing portion 33 is corresponding to steps S25–S27. In addition, the operation of the operation information obtaining portion 34 is corresponding to steps S29–S31.

The processing portion 30 may be realized by a special hardware or the functions of the processing portion 30 may be realized by having a CPU (Central Processing Unit) which is not illustrated within the processing portion 30 execute a program.

In addition, an initial data 41, a history of the editing operation information 42, and a contents data 43 are recorded in the recording portion 40. The recording portion 40 may be formed by recording apparatuses such as RAM's (Random Access Memory) or hard disks.

Although not illustrated in FIG. 8 or FIG. 9, an apparatus which is necessary for network communications is either included within the server 1 or the clients 2 or is connected to the server 1 or the clients 2. In addition, display apparatuses such as CRT's (Cathode Ray Tube) and liquid crystal display apparatuses, and input apparatuses such as mouses and keyboards are connected to the server 1 and the clients 2 as deemed necessary.

Next, the editing image of the digital contents according to the shared operation between the server and the clients which are connected to each other via a network will be explained with reference to FIG. 1, FIG. 4, and FIG. 5.

For example, as illustrated in FIG. 1, when an operation a1 is performed on the initial data of the contents by the client A, this operation information a1 is sent to the server. Next, an operation b1 is performed based on the results of the operation a1 by the client B which obtained the operation information a1 from the server. Then, this operation information b1 is sent to the server. In this manner, the editing operation of the contents data is performed via a network.

Figure 4:
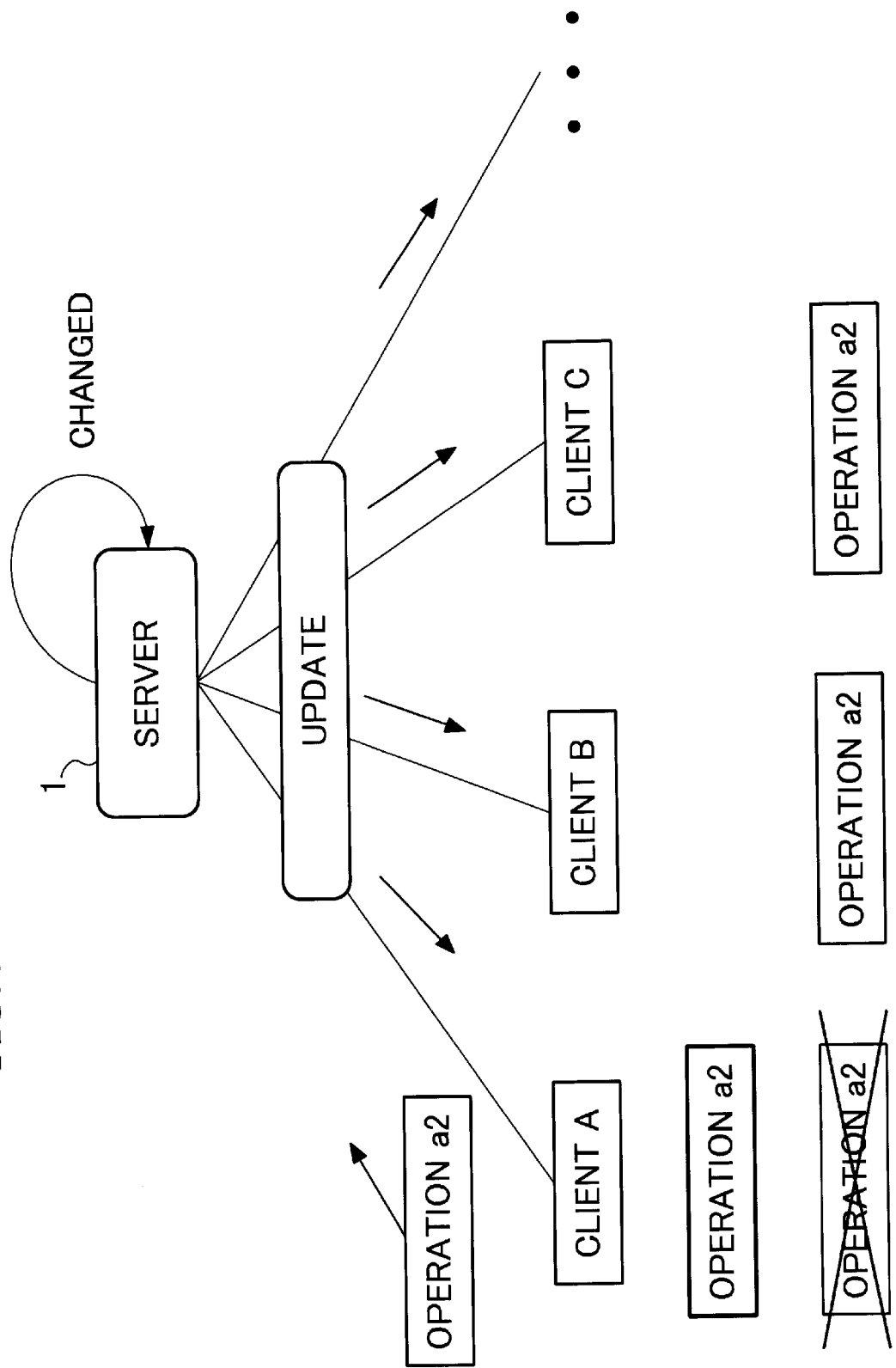
FIG. 4 is a conceptual diagram which illustrates a situation of the editing operation occurring at a given moment.

In addition, as illustrated in FIG. 4, the editing operation a2 of the contents data performed by the client A is sent to the server as an operation information, and the editing operation is performed on the contents data within the server, thereby changing the contents data. Additionally, at this moment, in order to update this change, the server sends the operation information a2 to all of the clients connected to the server. The client A which performed the above mentioned editing operation, however, ignores the operation information a2 sent from the server, but all of the other clients B, C, . . . , execute the editing operation. In this manner, the editing operation performed over a network is easily synchronized.

Figure 5:
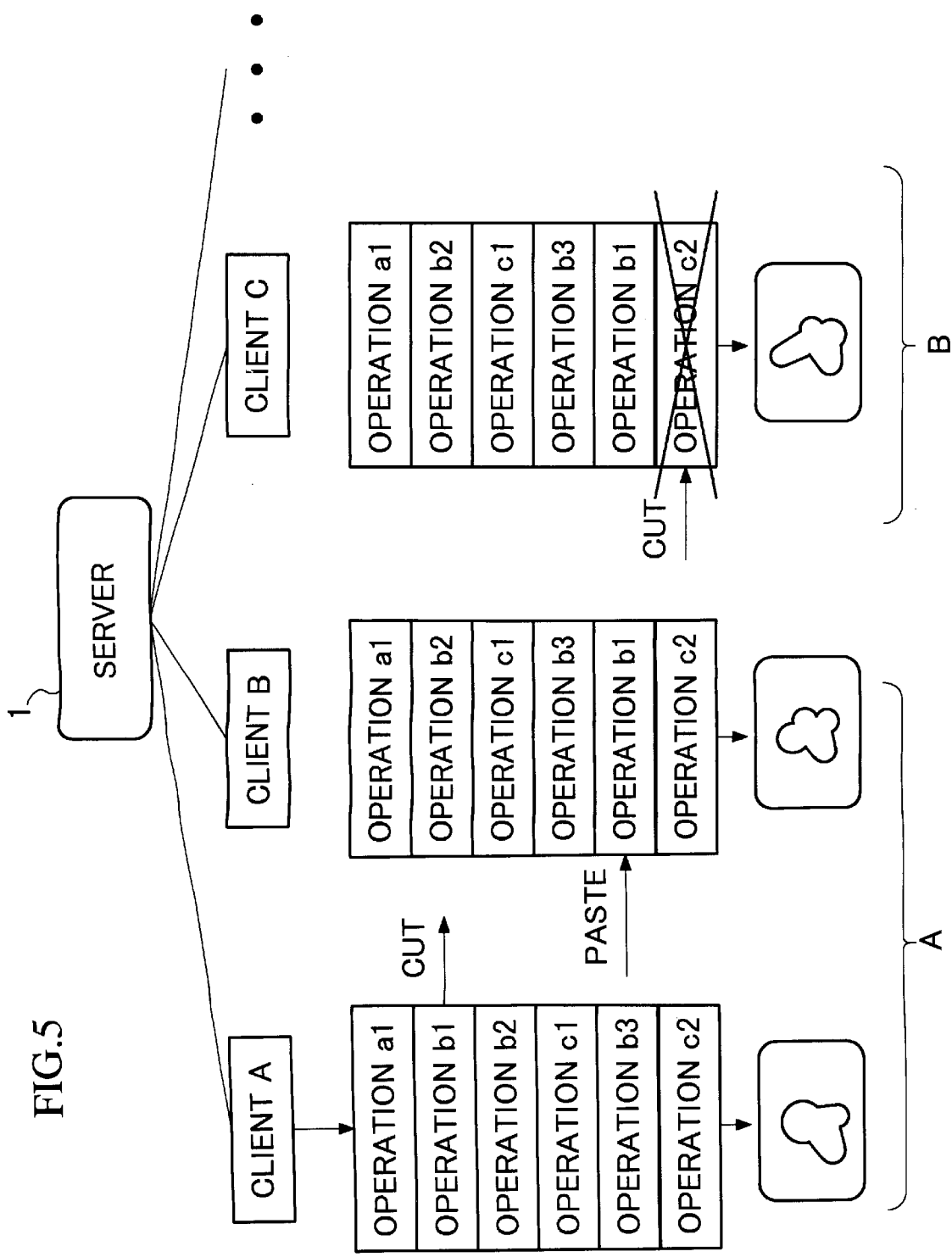
FIG. 5 is a conceptual diagram which illustrates a editing situation of the history of an editing operation information.

FIG. 5 is a diagram which illustrates the aspect of editing operation with respect to the history of the editing operation information. With the method of the present invention, by transmitting the editing operation information corresponding to an editing operation over a network, not only is the burden of the network lessened, but it is also possible for performing editing operations such as cut and paste and the changing of the order of the operations.

As the reference numeral "a" of FIG. 5 illustrates, a single operation history (operation b1) is removed from the history of the operation information of client A and is inserted at an arbitrary position. Using this process, the order of the operations may be switched or identical order of operations may be composed. Also, as the reference numeral "b" of FIG. 5 illustrates, it is possible to edit the editing operation itself such as removing a undesirable operation (operation c2) from the history of operation information of a different client.

By editing the editing operation, it is possible to lessen the history of editing information which is maintained by a client. However, results which are different than what is expected will be obtained unless the commutativity of the operation is well thought out. For example, assume that a history of operation information is as follows:

1: draw a line
2: paint the line green
3: draw a circle.

If the order of the history of operation information is changed so as to be 2→1→3, then there will be no object corresponding to that which the editing operation information 2 is supposed to paint. Therefore, when an editing operation directed towards the history of the editing operation information is sent from a client as an editing operation information, the operation information processing portion 13 of the server 1 judges whether or not this editing operation of the history is appropriate. If it is not appropriate, the server 1 notifies the client of this fact and does not send this editing operation information to the other clients.

Also, it is possible to have the above mentioned operation processing portion 33 of the client 2 to judge whether or not the editing operation of the history is appropriate. And only when it is deemed appropriate, does the operation processing portion 33 send the editing operation of the history to the server 1 as an editing operation information.

In addition, it is possible to use this process to make editing operation which are intended to have different results. Accordingly, it may be possible to create artistic drawings and such by editing the history of the editing operation information.

As explained above, by individually recording the editing operation of the contents data at a client, and by sending only the history of the editing operation information over a network, it is not necessary to read all of the contents data like the conventional method. And it is possible to perform the editing operation without generating a large burden on the network.

When a plurality of clients accesses the digital contents at the server and performs a editing operation on those contents data, only the editing operation information performed at each of the clients is sent over the network. The clients maintains the data of the initial condition of the digital contents and the corresponding history of the editing operation information. By this means, it is possible to perform an editing operation on the contents data through a network without reading all the data which form the digital contents, and a sense of operation which seems to be ready and waiting is realized.

At this time, the changes in the contents data according to the editing operation from a client is sent back to the server. However, it is necessary not only to send the editing operation information of this client to the server, but also to the other clients, and this process must be synchronized. Thus, when there is any change made to the contents data of the server, the server transmits the editing operation information to all of the clients, and informs them of the changes made to the contents data. And, each of the clients maintains that change as their history of editing operation, and makes changes to their contents data. By this means, it is possible to easily synchronize the editing operation of the contents data.

In addition, since the editing operation of the contents data is maintained as individual operation histories, it is possible to perform the cut and paste editing operations or the combinations or the reordering of the history of the editing operation with respect to the contents data at each of the clients. In other words, since it is possible to perform editing operations of the operation histories itself, it is possible to freely change the editing operation of the contents data performed at a different client which is not desirable.

Embodiment 2

When there are differences in the quality of the network and such in between the server and each of the clients, then differences in the transfer speeds are generated. If there are differences in the transfer speeds between each of the clients, then the clients with the faster transfer speed will have priority when the editing operation of the digital contents is made at the server. For example, let us examine the case where three clients A, B, C are accessing the server. At a given moment, the transferring times of each of the clients with respect to one unit of information (for example, an average amount of data of an editing operation information) are 50, 100, and 10, respectively, in units of time. In such a case, while client B is transferring one unit of information, client A may send two units of information (2=100/50), and client C may send ten units of information (10=100/10). Accordingly, if the server processes the editing operation information in the order the editing operation information are received, then an inequity of generated among each of the clients with respect to the editing operation information of the server. Hence, the present embodiment adds a new process to the processing portion 10 of the server 1 in FIG. 8. Here, a server which resolves the problem of the generation of differences in the transferring speeds will be explained.

Figure 10:
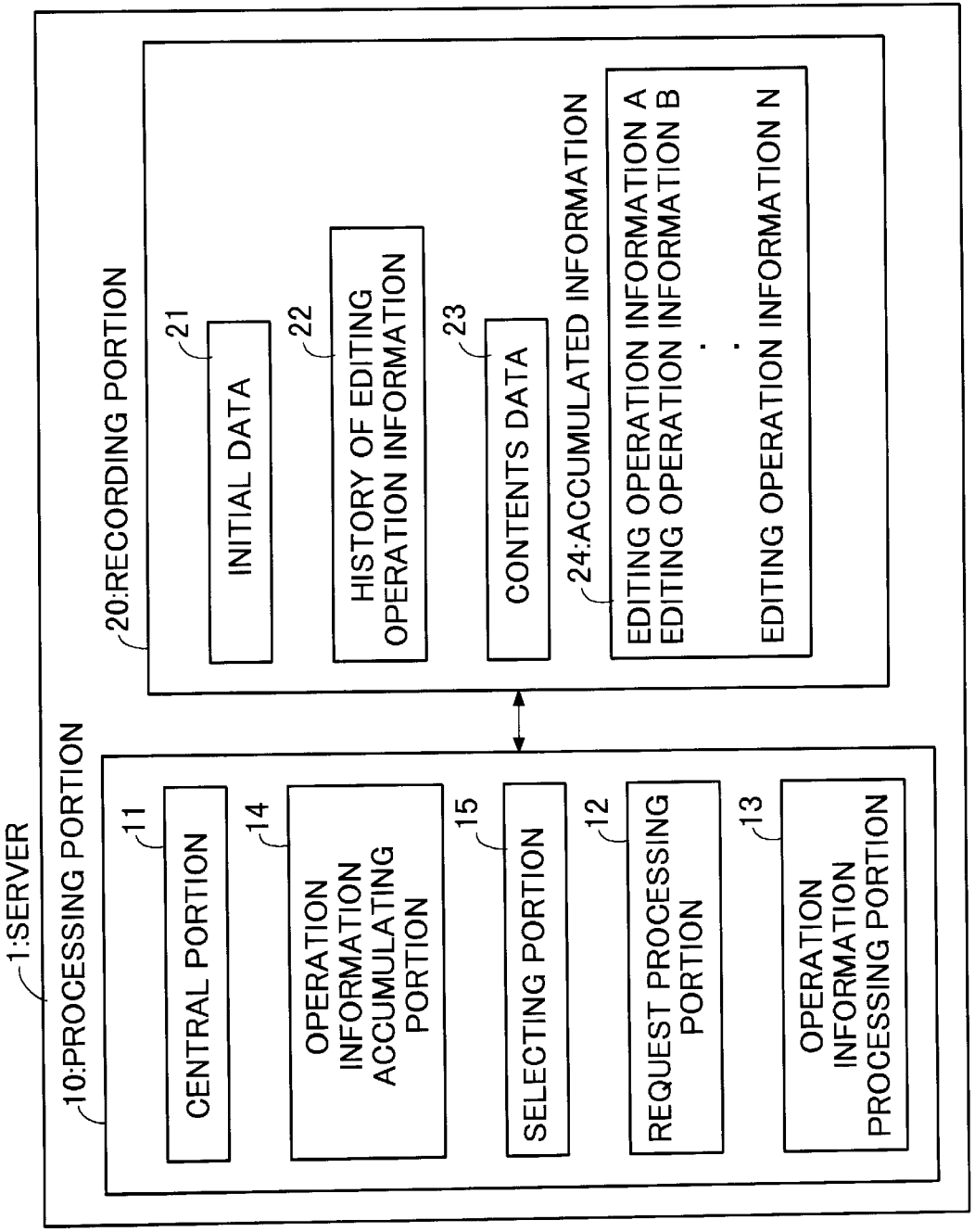
FIG. 10 is a diagram which illustrates an example of the structure of the server according to the second preferred embodiment.

First, the structure of the apparatus of the present embodiment is illustrated in FIG. 10. The difference between this structure and the one of FIG. 8 is that this structure comprises a operation information accumulating portion 14 which accumulates the editing operation information sent from a client at predetermined intervals in the recording portion 20 as an accumulated information 24, and a selecting portion 15 which, after the elapse of a predetermined interval, orderly selects the editing operation information accumulated as the accumulated information 24 in accordance with a predetermined selection rule. Each of the portions of FIG. 10 which have correspondence with the portions of FIG. 8 have identical reference numerals, and their explanations will be omitted here. Below, the operation of the server will be explained with reference to FIG. 11 with emphasis on the differences which exist between this embodiment and Embodiment 1.

First of all, the operation information accumulating portion 14 determines the interval at which the editing operation information sent from the clients is accumulated, and starts a timer which is not illustrated in FIG. 10 (step S31). The method of determining this interval will be explained in detail later.

And, when the central portion 11 receives the editing operation information from a client, it activates the operation information accumulating portion 14 and hands over the editing operation information to the operation information accumulating portion 14. During the interval determined by the step S31, the operation information accumulating portion 14 orderly accumulates this editing operation information in the recording portion 20 as an accumulated information 24 (step S32).

When the timer signals the elapse of an interval determined at step S31, the selecting portion 15 is activated. And, after the accumulating information 24 is accumulated according to a predetermined selection rule, the selecting portion 15 begins selecting the editing operation information (step S33). This selection rule will be explained in detail later.

The editing operation information selected at step S33 is handed over to the operation information processing portion 13. Then, the operation information processing portion 13 performs the processes described for steps S16, S17 of FIG. 2 on the editing operation information which was handed over. After these processes are completed, the selected editing operation information is then removed from the accumulated information 24.

The selecting portion 12 judges whether there are any editing operation information which are not yet processed remaining inside the accumulated information 24 (step S35). If there are some unprocessed information remaining, then in order to select the next editing operation information to be processed, the control is returned to step S33. Otherwise, the control proceeds to step S31 and performs the accumulating process at the next interval.

Figure 11:
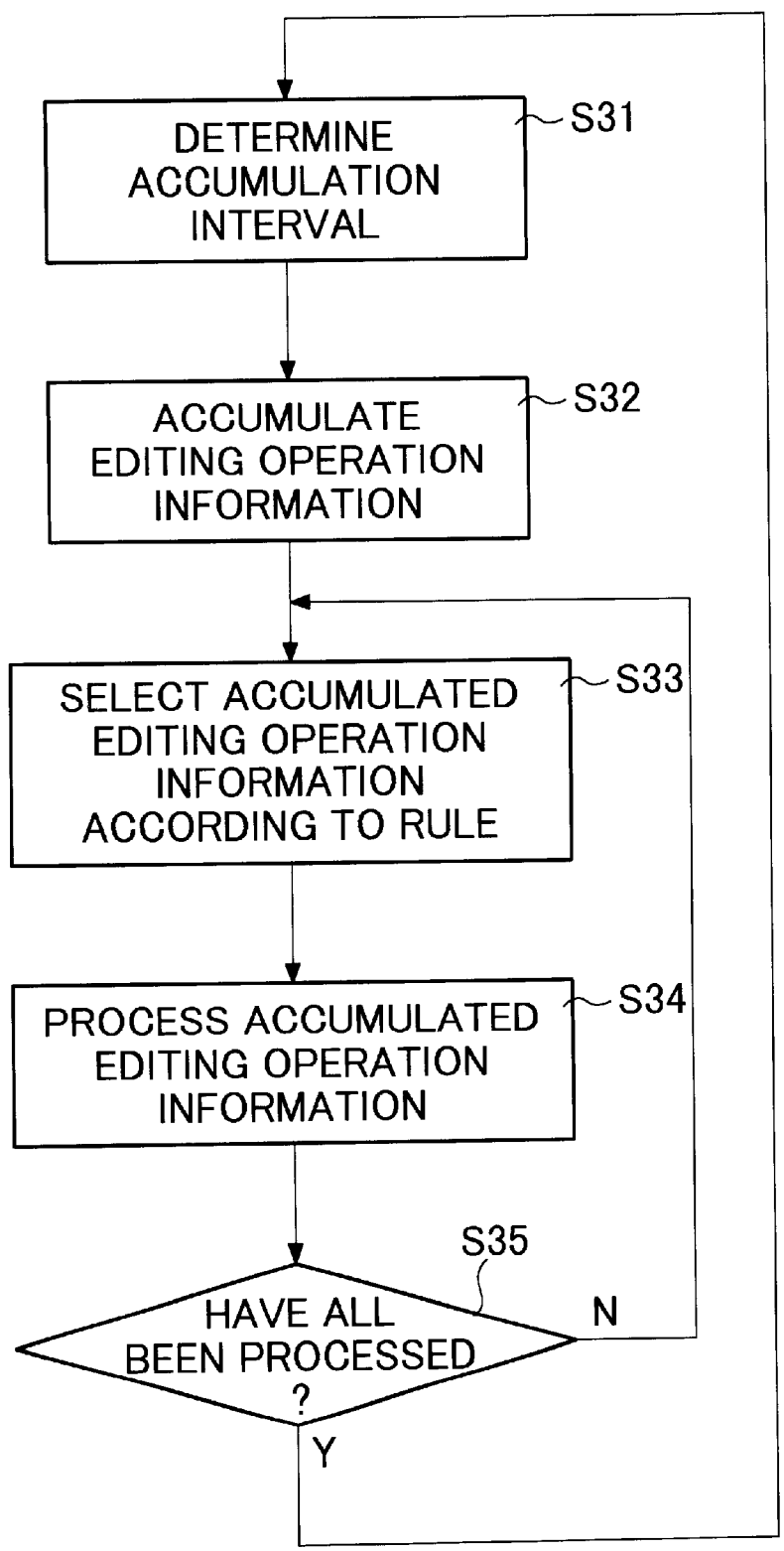
FIG. 11 is a control flow chart of the server according to the second preferred embodiment.

Although not illustrated in FIG. 11, the central portion 11 continually monitors for a data request from the clients (step S11 of FIG. 2), and when there is a request, the central portion 11 activates the request processing portion 12 in order to perform that process.

The server, hence, operates according to the above described means.

Next, the method of determining the interval which is determined at step S31 will be explained. Roughly categorized, this method of determining the interval may have three alternatives, all of which will be explained below.

The First Interval Determining Method

A fixed interval will be employed. That is, the interval is always determined beforehand. In this case, the accumulation interval determining process according to step S31 will be omitted.

The Second Interval Determining Method

The interval is determined based on the network transfer speeds between the clients. When the central portion 11 obtains the editing operation information which is sent from a client, it records the information relating to the transfer speeds of each of the clients in the recording portion 20, based on the size (number of bytes) of the editing operation information and the time (in seconds) required in obtaining that information. The operation information accumulating portion 14 determines the interval using that transfer speed as a reference. In the case where a plurality of editing operation information is sent from a client, the average value of the transfer speed which can be obtained from the sent information may be recorded in the recording portion 20. The above described measuring method is an example, and the present invention is in no way limited to such. A client sends the editing operation information to the server 1 with the client name attached to the information. By this means, the server 1 is able to identify each of the clients. Here, the "client name information" is defined to be the name of a digital contents editing apparatus which is a client and/or the username using that apparatus.

As a concrete example of the determining of the interval based on the transfer speed, the slowest transfer speed among the transfer speeds of all of the clients is used as a standard, which is the interval in which at least one unit of information (for example, an average amount of data of an editing operation information) can be obtained. For example, if the slowest transfer speed is $\alpha$ [bit/s] and one unit of information is $\beta$ [bit], then the interval is determined to be greater or equal to a $\alpha/\beta$ [s]. This is because if the interval is made to be less than this amount, then the editing operation information sent from the client with the slowest transfer speed will not be able to be accumulated within the determined interval.

The Third Interval Determining Method

The interval is determined based on the number clients accessing the server. That is, if the number of clients increases, then the interval is made to be longer. This is because when the number of clients is large, it can be considered that the number of editing operation informations transferred to the server is proportionally large, and by making the interval relatively long, a statistically even distribution of transfers may be obtained. For this reason, the central portion 11 monitors the number of clients accessing the server, and the operation information accumulating portion 14 determines the interval using this number as a reference.

Either one of the above described interval determining methods may be employed. In addition, the combination of the second and the third interval determining methods may be allowed.

Next, the selection rule of step S33 will be explained in detail. There are two types of selection rules: the selection rule which is based on the transmitting time of the editing operation information from the client, and the selection rule which is based on the names of the clients. These two selection rules will be explained below.

The Selection Rule Based on the Transmitting Time

The selection rule based on the transmitting time is the rule in which the editing operation informations are selected in the chronological order of the transmitting times. According to this selection rule based on the transmitting time, the clients all send editing operation informations with the transmitting times attached to the informations. And, by referring to the transmitting times attached to the editing operation information, the selecting portion 15 can select the editing operation informations in order, from the plurality of editing operation informations accumulated in the accumulated information 24. By this means, the editing operation informations are processed in chronological order of the times when the clients transmits the informations to the server, and so an editing operation information which is sent to the server first will not be processed after others.

The Selection Rule Based on Client Names

The selection rule based on client names can be roughly categorized into four types. Each of these will be explained below. According to this selection rule based on client names, the clients all send editing operation informations with their client name information attached to the editing operation information. And, by referring to the client name attached to the editing operation information, the selecting portion 15 can select the editing operation informations in order, from the plurality of editing operation informations accumulated in the accumulated information 24.

First Rule

The selection rule in which each of the client's selection order is fixed.

For example, a priority order is permanently applied in the following order: client A, client B, and client C. Then, the selection is always made in this order. This process is effective when there is a difference in the transmitting speed between the client and the server and when the changes in the transmitting speed are minimal.

Second Rule

The rule in which the selection order of each of the clients is changed after each predetermined time interval.

For example, in the case of three clients, the selection order is changed as follows:

Selection order of first predetermined time interval: client A, client B, client C Selection order of second predetermined time interval: client B, client C, client A Selection order of third predetermined time interval: client C, client A, client B.

By this means, the processing of the editing operation information of each of the clients are allocated evenly. In order to make process of the changing of the priority orders simple, it is desirable to make each of the changes at each accumulating interval performed at step S32.

Third Rule

The selection order is determined by the times when each of the clients opens their connections with the server. That is, the central portion 11 records the connection opening times of each of the clients in the recording portion 10, and by referring to these times, the selecting portion 15 raises the selection order of the clients whose connection opening times are earlier.

Fourth Rule

The selection order is determined by the process load of the client. For this, the central portion 11 records the process load of each of the clients which was processed in the past or during a fixed time period, and by referring to these values, the selecting portion 15 raises the selection order of the clients whose process load is greater.

Any one of the above described selection rules based on the client name may be employed. In the case where a plurality of editing operation informations exist for each of the clients in the accumulated information 24, and assuming that the selection order is client A, client B, and client C, the selecting portion 15 may perform either of the following selecting processes:

A) after selecting all of the editing operation information from client A, select all of the editing operation information from client B, and finally select all of the editing operation information from client C; or B) select the first editing operation information from client A, then the first editing operation information from client B, then the first editing operation information from client C, then the second editing operation information form client A, and so on.

According to the above, even if there is differences in the transfer speeds among the server and each of the clients, the server performs the process of accumulating the editing operation information from the clients during a predetermined interval, and selecting the editing operation information for processing according to a selection rule. By this means, when the digital contents editing operation process is performed, the clients with faster transfer speeds are not given priority.

Embodiment 3

As in Embodiment 2, when the process of accumulating the editing operation information sent from the clients during predetermined intervals is continually being performed, the editing efficiency of the digital contents decreases due to the overhead cost of the above process. More particularly, in cases where that type of process is not necessary, for example, when there are no differences in the transfer speeds among the server and each of the clients, simply, the editing efficiency decreases.

Consequently, a server of the present embodiment which prevents the lowering of the editing efficiency by adding a new process to the processing portion 10 of the server 1 of FIG. 8 will be explained.

Figure 12:
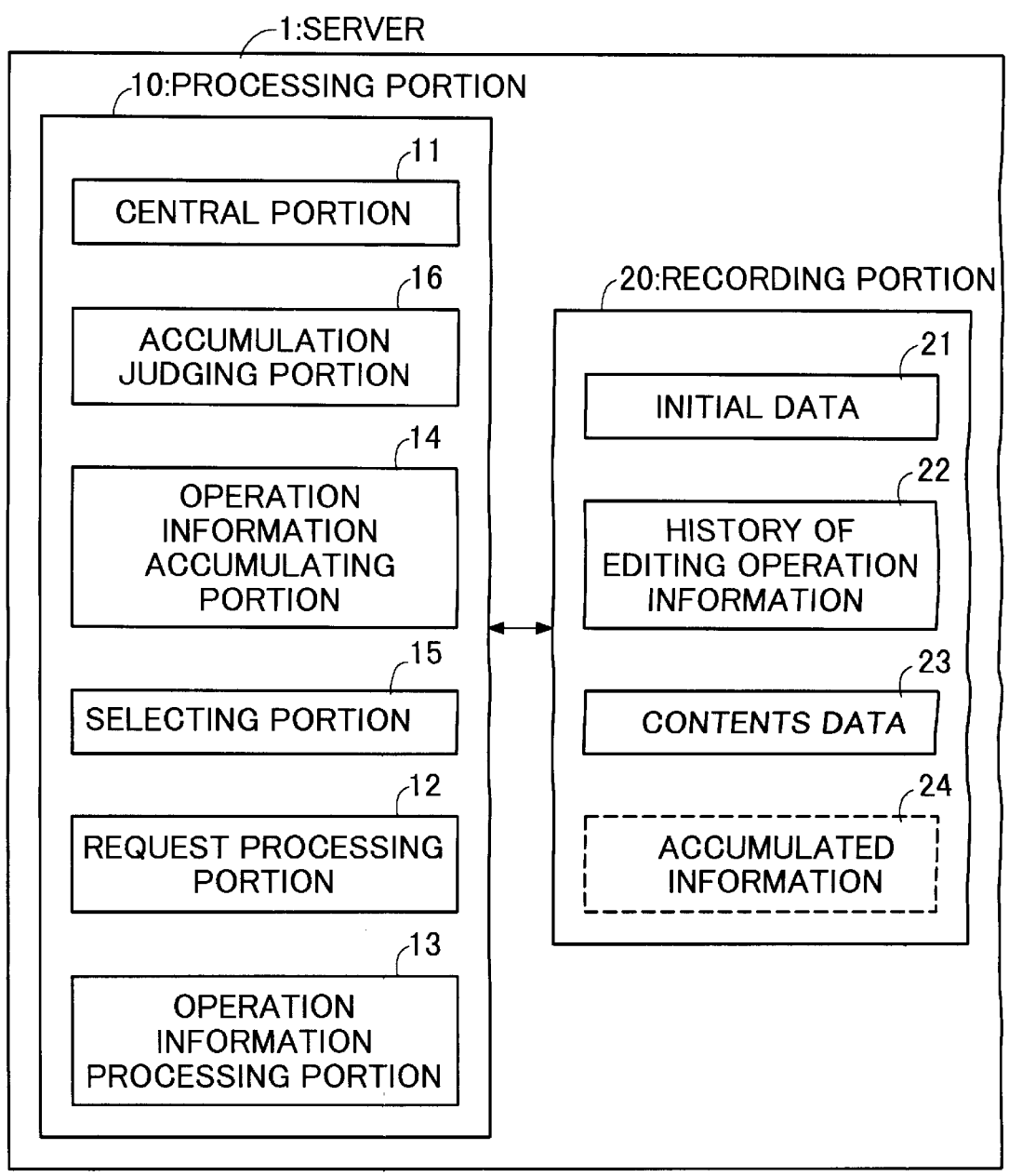
FIG. 12 is a diagram which illustrates an example of the structure of the server according to the third preferred embodiment.

First of all, the structure of the apparatus of the present embodiment is illustrated in FIG. 12. The difference which exist with FIG. 10 is that this embodiment further comprises a accumulation judging portion 16 which judges whether or not the accumulation process of Embodiment 2 is to be held. Each of the portions of FIG. 12 which have correspondence with the portions of FIG. 10 have identical reference numerals, and their explanations will be omitted here. Below, the operation of the server will be explained with reference to FIG. 13 with emphasis on the differences which exist between this embodiment and Embodiment 2

First, the accumulation judging portion 16 judges whether or not to accumulate the editing operation information sent from a client within a predetermined interval and to process that information (step S41). This judging method will be explained in detail later.

When it is judged that the editing operation information from a client needs to be accumulated during a predetermined interval and then processed, this editing operation information sent from the client is processed by the above mentioned operation information accumulating portion, the selecting portion, and the operation information processing portion (step S31–S35). These processes are identical to steps S31–S35 of FIG. 11; hence, their explanations will be omitted here.

On the other hand, when it is judged that the editing operation information from a client does not need to be accumulated during a predetermined interval and then processed, this editing operation information sent from the client is processed by the above mentioned operation information processing portion in the order the information arrives at the server (step S42). This process of step S42 is identical to steps S16, S17 of FIG. 2; hence, its explanation will be omitted here.

Thus, the server 1 operates as described above.

Next, the judging method of step S41 will be explained in detail. There are two ways to perform this judging method, and each method will be explained below.

The First Judging Method

In the case where the difference in the transfer speeds among each of the clients within the network is greater than or equal to a predetermined value, it is judged that the processes of step S31 through step S35 is to be performed. Otherwise, it is judged that the process of step S42 is to be performed. To be more precise, the differences of the transfer speed among each of the clients is obtained, and the greatest value of those differences is judged whether or not it is greater than or equal to predetermined value. In the case where the difference in the transfer speeds among each of the clients is small, the editing operation information from the clients will arrive at the server in the order of the transmitting times. Therefore, it is not necessary to perform the processes according to steps S31–S35.

The Second Judging Method In the case where the transfer speeds among a client within the network is less than or equal to a predetermined value, it is judged that the processes of step S31 through step S35 is to be performed. Otherwise, it is judged that the process of step S42 is to be performed. To be more precise, the slowest transfer speed among the transfer speeds of each of the clients is judged whether or not it is less than or equal to predetermined value. In the case when the slowest transfer speed is less than the predetermined value, that is, when the transfer speed is slow, there is generally a high possibility that the differences in the transfer speeds of the other clients are large.

Either of the above described judging methods may be employed. The obtaining method for the transfer speeds of each of the clients is explained in Embodiment 2; hence, its explanation will be omitted here.

Figure 13:
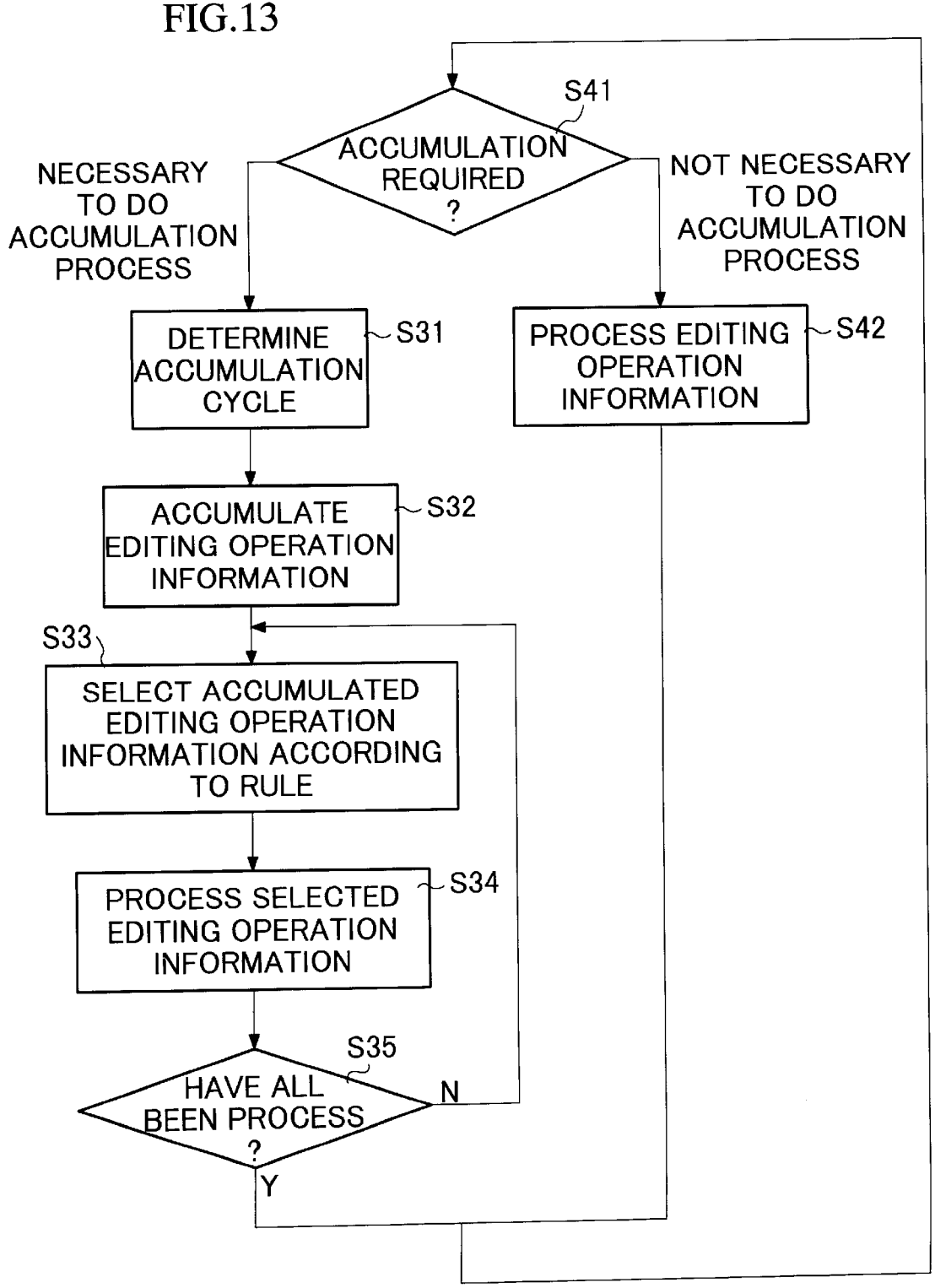
FIG. 13 is a control flow chart of the server according to the third preferred embodiment.

As described above, the server 1 performs the processes of steps S31–S35 of FIG. 13 only when those processes are necessary. Consequently, the lowering of the editing efficiency of the digital contents is prevented.

The server functionality which performs the editing of the digital contents through shared operation with clients connected via a network may be realized by first, recording on a computer-readable recording medium, the program which allows the realization of the functionality of the processing portion 10 of the server 1 according to FIG. 8, FIG. 10, and FIG. 12, and second, having a computer system read and execute the program which is recorded in the recording medium. In addition, The client functionality which performs the editing of the digital contents through shared operation with the server connected via a network may be realized by first, recording on a computer-readable recording medium, the program which allows the realization of the functionality of the processing portion 30 according to FIG. 9, and second, having a computer system read and execute the program which is recorded in the recording medium. Here, the above mentioned "computer system" includes OS's and hardware such as peripheral apparatuses.

Although a detailed explanation of the embodiments of the present invention was made with reference to drawings, the actual structure need not be limited to these embodiments and the actual structure may include designs which do not deviate from the scope and spirit of this invention.

What is claimed is:

1. A digital contents editing method which performs an editing operation of digital contents between a server, the server having a recording portion in addition to a processing portion, and a plurality of clients connected via a network, comprising:

a step of accumulating initial data of the digital contents and the editing operation information, the editing operations on said initial data of the digital contents is digitized at a client from the plurality of clients, in the recording portion of the server, and sending, under control of the processing portion of the server, said data and information to the clients which are involved in the editing operation; and a step of having each client perform the editing operation of said digital contents by creating said editing operation information in which the editing operation of said digital contents is digitized and by communicating only said editing operation information to each other via the server and said network;

a step of having the server accumulate said editing operation information during each predetermined interval as accumulated information;

a step of having the server orderly select said editing operation information which is accumulated as said accumulated information in accordance with a selection rule, which is determined according to a condition of the network, for eliminating an imbalance generated among each of the clients with respect to the editing operation of the digital contents caused by differences in the quality of the network in between the server and each of the clients, after said predetermined interval elapses; and a step of having the server orderly accumulate said selected editing operation information as history, and send said editing operation information to all of the clients.

2. A digital contents editing method processed by a server which performs an editing operation of digital contents by shared operation with a plurality of clients which are connected via a network, comprising:

a step of recording at least initial data of the digital contents and the editing operation information in which the editing operations on said initial data of the digital contents are digitized;

a step of sending information which is necessary for the starting of the editing of said digital contents to a client, according to a request from said client;

a step of orderly accumulating the editing operation information in a recording portion of the server by an operation information processing portion of the server, wherein the editing operation of said digital contents is digitally sent from a client as history; and sending said editing operation information to the clients by the operation information processing portion of the server;

a step of accumulating said editing operation information during each predetermined interval as accumulated information;

a step of orderly selecting said editing operation information which is accumulated as said accumulated information in accordance with a selection rule, which is determined according to a condition of the network, for eliminating an imbalance generated among each of the clients with respect to the editing operation of the digital contents caused by differences in the quality of the network in between the server and each of the clients, after said predetermined interval elapses; and a step of orderly accumulating said selected editing operation information as history, and sending said editing operation information to all of the clients.

3. A digital contents editing method in accordance with claim 2, further comprising, in the case where said editing operation information sent from said client is to be processed:

a step of obtaining the difference in the transfer speeds among each of the clients within said network;

in the case where said difference is greater than or equal to a predetermined value, a step of accumulating said editing operation information sent from a client during each predetermined interval as accumulated information, and after said predetermined interval elapses, orderly selecting the editing operation information which is accumulated as said accumulated information in accordance with said selection rule, orderly accumulating said selected editing operation information as history, and sending said editing operation information to all of the clients; and in the case where said difference is less than said predetermined value, a step of orderly accumulating the editing operation information sent from a client as history, and sending said editing operation information to all of the clients.

4. A digital contents editing method processed by a client which performs an editing operation of digital contents by shared operation with a server of claim 2 which is connected via a network, comprising:

a step of obtaining from said server and recording the information which is necessary for the starting of the editing of the digital contents;

a step of digitizing the editing operation of the digital contents as an editing operation information, and sending said editing operation information to said server; and a step of recording as necessary said editing operation information sent from said server.

5. A digital contents editing apparatus which performs an editing operation of digital contents by shared operation with a plurality of clients which are connected via a network, comprising:

a recording portion which accumulates at least initial data of the digital contents and the editing operation information in which the editing operations on said initial data of the digital contents are digitized;

a request processing portion which sends information which is necessary for the starting of the editing of said digital contents to a client, according to a request from said client;

an operation information processing portion which orderly accumulates the editing operation information in a recording portion and sends said editing operation information to the clients, wherein the editing operation of said digital contents is digitally sent from a client as history;

an operation information accumulating portion which accumulates the editing operation information sent from a client during each predetermined interval in said recording portion as accumulated information;

a selecting portion which orderly selects said editing operation information which is accumulated as said accumulated information in accordance with a selection rule, which is determined according to a condition of the network, for eliminating an imbalance generated among each of the clients with respect to the editing operation of the digital contents caused by differences in the quality of the network in between the server and each of the clients, after said predetermined interval elapses; and wherein said operation information processing portion performs the processing of the editing operation information selected by said selecting portion.

6. A digital contents editing apparatus in accordance with claim 5, in which said operation information accumulating portion determines said predetermined interval based on the transfer speeds among the clients within said network.

7. A digital contents editing apparatus in accordance with claim 5, in which said operation information accumulating portion determines said predetermined interval based on the number of accessing clients.

8. A digital contents editing apparatus in accordance with claim 5, in which, when said editing operation information having attached the transmitting time information is sent from said client, said selecting portion orderly selects the editing operation information which is accumulated as said accumulated information in accordance with said selection rule based on transmitting times.

9. A digital contents editing apparatus in accordance with claim 5, in which, when said editing operation information having attached the client name information is sent from said client, said selecting portion orderly selects the editing operation information which is accumulated as said accumulated information in accordance with said selection rule based on client names.

10. A digital contents editing apparatus in accordance with claim 9, in which said selecting portion changes said selection rule based on client names after each predetermined time interval.

11. A digital contents editing apparatus in accordance with claim 9, in which said selection rule based on client names has the selection order determined by the time when a client opens a connection to the digital contents editing apparatus.

12. A digital contents editing apparatus in accordance with claim 9, in which said selection rule based on client names has the selection order determined by the editing process load of each client.

13. A digital contents editing apparatus in accordance with claim 5, further comprising an accumulation judging portion which has said operation information accumulating portion, said selecting portion, and said operation information processing portion process the editing operation information sent from a client, when the difference in the transfer speeds among the clients within said network is greater than or equal to a predetermined value, and which has said operation information processing portion process the editing operation information sent from a client in the order said information arrives at said operation information processing portion, when the difference in the transfer speeds among the clients within said network is less than said predetermined value.

14. A digital contents editing apparatus in accordance with claim 5, further comprising an accumulation judging portion which has said operation information accumulating portion, said selecting portion, and said operation information processing portion process the editing operation information sent form a client, when the transfer speed of a client within said network is less than or equal to a predetermined value, and which has said operation information processing portion process the editing operation information sent from a client in the order said information arrives at said operation information processing portion, when the transfer speed of a client within said network is greater than said predetermined value.

15. A client apparatus which performs an editing operation of digital contents by shared operation with a digital contents editing apparatus of claim 5 which is connected via a network, comprising:

a recording portion which accumulates the information which is necessary for the starting of the editing of the digital contents and the editing operation information in which the editing operation of said digital contents is digitized;

an initializing portion which obtains the information which is necessary for the starting of the editing of said digital contents from the digital contents editing apparatus, and which has said recording portion record said information;

an operation processing portion which digitizes the editing operation of the digital contents as an editing operation information, and which sends said editing operation information to the digital contents editing apparatus and an operation information obtaining portion which records as necessary said editing operation information sent from the digital contents editing apparatus.

16. A client apparatus in accordance with claim 15, in which said operation processing portion:

performs the process of orderly recording said editing operation information which is sent from said server as history; and when an editing operation is performed on the history of the editing operation information which is recorded in said recording portion, the editing operation information of said history is sent to the digital contents editing apparatus as an editing operation information.

17. A client apparatus in accordance with claim 16, in which said operation processing portion judges whether or not the editing of said history is appropriate, and only when said editing is appropriate does said operation processing portion send said editing operation of said history to said server as an editing operation information.

18. A computer-readable recording medium which records a digital contents editing program for a client which performs an editing operation of digital contents by shared operation with a digital contents editing apparatus of claim 6 which is connected via a network, and which has a computer perform the processes of:

obtaining from the digital contents editing apparatus and record the information which is necessary for the starting of the editing of the digital contents;

digitizing the editing operation of the digital contents as an editing operation information, and send said editing operation information to the digital contents editing apparatus and recording as necessary said editing operation information sent from the digital contents editing apparatus.

19. A digital contents editing apparatus in accordance with claim 5, in which said operation information processing portion generates contents data by performing an editing operation based on the editing operation information from said client, and further performs a process for recording said contents data in said recording portion; and in which said request processing portion performs a comparison between the amount of data of said contents data and the sum of the amount of data of said initial data and said editing operation information, and has the one with the smaller amount of data be the information which is necessary for the starting of the editing of the digital contents.

20. A digital contents editing apparatus in accordance with claim 5, in which when a client sends an editing operation of the history of the editing operation information as an editing operation information, said operation information processing portion judges whether or not the editing operation of said history is appropriate, and if it is not appropriate, said operation information processing portion notifies said client of that fact and does not send said editing operation information to any of the clients.

21. A computer-readable recording medium which records a digital contents editing program for a server which performs an editing operation of digital contents by shared operation with a plurality of clients which are connected via a network, and which has a computer perform the processes of:

recording at least initial data of the digital contents and the editing operation information in which the editing operations on said initial data of the digital contents are digitized;

sending the information which is necessary for the starting of the editing of said digital contents to a client, according to a request from said client;

orderly accumulating the editing operation information, in which the editing operation of the digital contents, sent from a client, and sending said editing operation information to all of the clients;

accumulating said editing operation information during each predetermined interval as accumulated information;

orderly selecting said editing operation information which is accumulated as said accumulated information in accordance with a predetermined selection rule, which is determined according to a condition of the network, for eliminating an imbalance generated among each of the clients with respect to the editing operation of the digital contents caused by differences in the quality of the network in between the server and each of the clients, after said predetermined interval elapses; and orderly accumulating said selected editing operation information as history, and sending said editing operation information to all of the clients.

22. A recording medium which records a digital contents editing program in accordance with claim 21, which, in the case where said editing operation information sent from said client is to be processed, performs the processes of:

obtaining the difference in the transfer speeds among each of the clients within said network;

in the case where said difference is greater than or equal to a predetermined value, accumulating said editing operation information sent from a client during each predetermined interval as accumulated information, and after said predetermined interval elapses, orderly selecting the editing operation information which is accumulated as said accumulated information in accordance with a selection rule, accumulating said selected editing operation information as history, and sending said editing operation information to all of the clients; and in the case where said difference is less than said predetermined value, orderly accumulating the editing operation information sent from a client as history, and sending said editing operation information to all of the clients.

\* \* \* \* \*